US008885027B2

(12) United States Patent
Yamaguchi et al.

(10) Patent No.: US 8,885,027 B2
(45) Date of Patent: Nov. 11, 2014

(54) STEREOSCOPIC DISPLAY DEVICE AND CONTROL METHOD THEREFOR

(75) Inventors: Hiroichi Yamaguchi, Sagamihara (JP); Naoyuki Okata, Yokohama (JP); Tomohiko Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1841 days.

(21) Appl. No.: 11/463,083

(22) Filed: Aug. 8, 2006

(65) Prior Publication Data
US 2007/0046776 A1    Mar. 1, 2007

(30) Foreign Application Priority Data

Aug. 29, 2005  (JP) ................................ 2005-248198
Jun. 16, 2006  (JP) ................................ 2006-168124

(51) Int. Cl.
H04N 13/04    (2006.01)
G09G 5/00     (2006.01)
G01R 23/02    (2006.01)
H04N 13/00    (2006.01)
H04N 13/02    (2006.01)

(52) U.S. Cl.
CPC ....... *H04N 13/0059* (2013.01); *H04N 13/0239* (2013.01); *H04N 13/044* (2013.01); *H04N 13/0037* (2013.01)
USPC .............................. 348/51; 345/679; 250/250

(58) Field of Classification Search
CPC .......... H04N 13/0059; H04N 13/0239; H04N 13/044; H04N 1/00373
USPC .......................................................... 348/51
See application file for complete search history.

(56) References Cited

U.S. PATENT DOCUMENTS

| 5,825,456 | A  |   | 10/1998 | Tabata et al. |
|-----------|----|---|---------|---------------|
| 5,856,843 | A  |   | 1/1999  | Muramoto      |
| 6,326,995 | B1 |   | 12/2001 | Palm et al.   |
| 2001/0036307 | A1 |   | 11/2001 | Hanna et al. |
| 2002/0075286 | A1 | * | 6/2002  | Yonezawa et al. ............ 345/679 |
| 2004/0145655 | A1 |   | 7/2004  | Tomita        |
| 2004/0238732 | A1 | * | 12/2004 | State et al. .................... 250/250 |
| 2005/0024388 | A1 |   | 2/2005  | Takemoto      |

FOREIGN PATENT DOCUMENTS

| CN | 1254239 A   | 5/2000  |
|----|-------------|---------|
| EP | 0680229 A2  | 11/1995 |
| EP | 1521482 A2  | 4/2005  |
| JP | 05-113895   | 5/1993  |

(Continued)

OTHER PUBLICATIONS

The above references were cited in a Dec. 26, 2008 Chinese Office Action that issued in Chinese Patent Application 200610126187.5, which is enclosed with English Translation.

(Continued)

*Primary Examiner* — Hee-Yong Kim

(74) *Attorney, Agent, or Firm* — Cowan, Liebowitz & Latman, P.C.

(57) ABSTRACT

For example, display image input units 131R, 131L detect additional information indicating left and right directionality from images for display. Then, in a stereoscopic display device having a display device for the right eye and a display device for the left eye, a switcher 132 capable of switching the connections between input and output input-output is controlled so that the correct image for display is provided to the correct display device. With such a configuration, even when the cables are connected incorrectly, it is still possible to input stereoscopic images to the stereoscopic display device so that such images are always displayed in the correct left-right relation.

11 Claims, 20 Drawing Sheets

(56) References Cited

FOREIGN PATENT DOCUMENTS

| | | | | |
|---|---|---|---|---|
| JP | 08-237688 A | 9/1996 | | |
| JP | 08-307903 A | 11/1996 | | |
| JP | 09-116931 | * 5/1997 | ............. | H04N 13/02 |
| JP | 09-116931 A | 5/1997 | | |
| JP | 10-115655 | 5/1998 | | |
| JP | 10-308796 | 11/1998 | | |
| JP | 11-275605 A | 10/1999 | | |
| JP | 11-296260 | 10/1999 | | |
| JP | 2002-159019 A | 5/2002 | | |
| JP | 2002-216125 A | 8/2002 | | |
| JP | 2003-228115 | 8/2003 | | |

OTHER PUBLICATIONS

The above Japanese patent documents were cited in a Jan. 7, 2011 Japanese Office Action, which is enclosed without an English Translation, that issued in Japanese Patent Application No. 2006-168124.

The above reference was cited in a Jun. 26, 2009 Chinese Office Action that issued in Chinese Patent Application No. 200610126187.5, which is enclosed with English Translation.

The above references European Search Report issued on Dec. 12, 2011, which is enclosed, that issued in the corresponding European Patent Application No. 06118666.4.

The above references were cited European Search Report issued on Sep. 13, 2012, which is enclosed, that issued in the corresponding European Patent Application No. 06118666.4.

* cited by examiner

F I G. 7
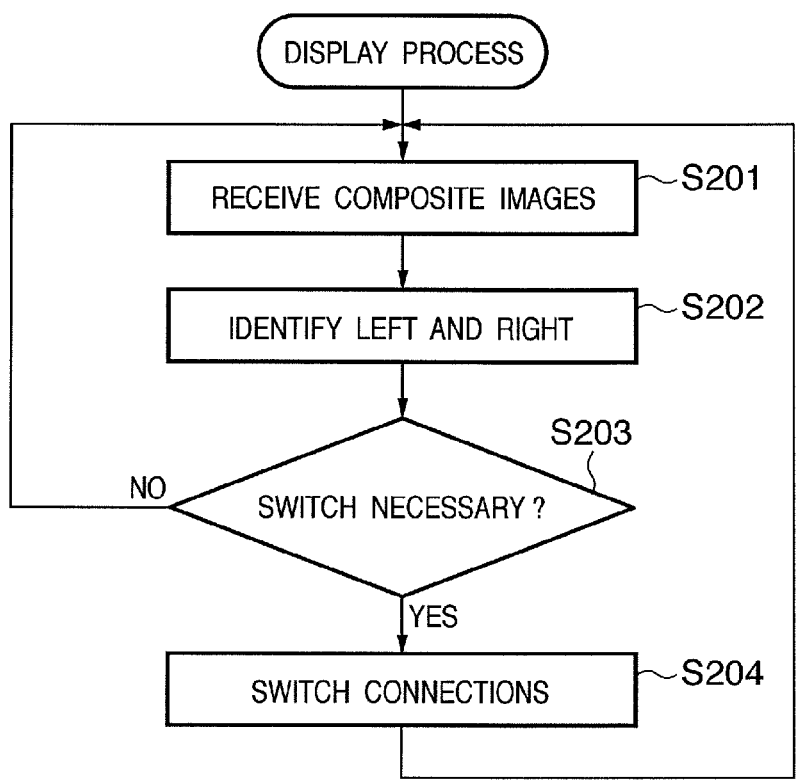

STEREOSCOPIC DISPLAY DEVICE AND CONTROL METHOD THEREFOR

INCORPORATION BY REFERENCE

This application claims the benefit of Japanese Patent Application No. 2005-248198, filed on Aug. 29, 2005 and Japanese Patent Application No. 2006-168124, filed Jun. 16, 2006, which are hereby incorporated by reference herein in their entirety.

BACKGROUND OF THE INVENTION

1. Field of the Invention

The present invention relates to a stereoscopic display device and control method therefor, and more particularly, to a head-mounted type stereoscopic display device and control method therefor.

2. Description of the Related Art

In recent years, as a technology for fusing real and virtual worlds in real time and seamlessly, a Mixed Reality (MR) technology is known.

In addition, as a device for experiencing Mixed Reality, a stereoscopic video see-through HMD (Head Mounted Display) is known. A stereoscopic video see-through HMD is a device that displays stereoscopic images in front of the eyes of the wearer. When composite images, in which three-dimensional virtual images seen from the viewpoint position of the wearer are superimposed on stereoscopic video images that are substantially the same as those seen when the user is not wearing the HMD, are generated and presented to the HMD, the wearer experiences a feeling just like that in which virtual objects appear to be present in real space. That is Mixed Reality.

It should be noted that, in general, virtual object images are usually implemented by CG (Computer Graphics). In addition, stereoscopic video images are usually sensed by a stereoscopic video camera attached to the HMD.

FIG. 2 is a schematic diagram showing a state of attachment of a stereoscopic video see-through HMD 400. The video see-through HMD 400 has the external appearance of eyeglasses or goggles, inside of which a display device for the right eye 402R and a display device for the left eye 402L, composed for example of LCDs, are disposed. In addition, where the stereoscopic video images are acquired by video cameras attached to the HMD, for example, stereoscopic video cameras 401R, 401L are mounted at positions near the viewpoint position of the wearer.

In order to create this experience of Mixed Reality, it is necessary to supply a three-dimensional image. In order to do that, it is necessary to input a composite image for the left eye and a composite image for the right eye, generated by inputting images sensed with two video cameras (left and right) to an image processing apparatus and superimposing virtual object images thereon, correctly to HMD left- and right-display devices.

However, because in an actual environment cables other than video signal cables are also connected between the image processing apparatus and the HMD (for example, HMD power supply cables as well as position and orientation sensor cables), the cables for each of the left and the right are sometimes connected incorrectly.

In the case of stereoscopic images, if the image for the left eye and the image for the right eye are displayed in reverse, not only is the result not recognizable as a three-dimensional image but also the observer experiences eye strain. For example, in the field of single-lens-reflex cameras, a technology has been proposed that determines whether or not the lens that is installed has the proper compatibility (Japanese Patent Laid-Open No. 2003-228115). However, a single-lens-reflex camera is very different from a stereoscopic HMD and the problem of mistaking left and right does not arise. Moreover, interchangeable lenses and video input connections are completely different in their structure and their purpose.

Thus, as described above, conventionally, there has been no mechanism for aiding the user in correctly inputting left and right image signals to a head-mounted type stereoscopic display device.

SUMMARY OF THE INVENTION

The present invention is conceived in light of the above-described problems of the conventional art.

According to an aspect of the present invention, there is provided a stereoscopic display device that performs stereoscopic display by displaying images for display on a display device for right eye and a display device for left eye, respectively, comprising: receiving unit adapted to receive a stereoscopic image composed of a pair of images for display; identification unit adapted to identify each image of the pair of images for display as either a display image for the right eye or a display image for the left eye; output unit adapted to take the pair of images for display as input and to output one of the pair of images to the display device for the right eye and the other of the pair of images to the display device for the left eye; and control unit adapted to control the output unit so that, based on results of identification by the identification unit, an image for display determined to be the image for display for the right eye is output to the display device for the right eye and an image for display determined to be the image for display for the left eye is output to the display device for the left eye.

According to another aspect of the present invention, there is provided a control method for a stereoscopic display device having output unit capable of taking a pair of images for display as input and outputting one such image to a display device for the right eye and the other such image to a display device for the left eye, comprising: a receiving step of receiving a stereoscopic image composed of a pair of images for display; an identification step of identifying each image of the pair of images for display as either a display image for the right eye or a display image for the left eye; and a control step of controlling the output unit so that, based on results of identification in the identification step and the current input-output relation of the output unit, an image for display determined to be the image for display for the right eye is output to the display device for the right eye and an image for display determined to be the image for display for the left eye is output to the display device for the left eye.

With such a structure, the stereoscopic display device of the present invention enables the user to connect the image input cable without concern for whether the image signals are for the right eye or for the left eye.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flow chart showing image display processing in a video see-through HMD according to the embodiments;

DESCRIPTION OF THE EMBODIMENTS

Preferred embodiments of the present invention will now be described in detail in accordance with the accompanying drawings.

First Embodiment

Figure 1:
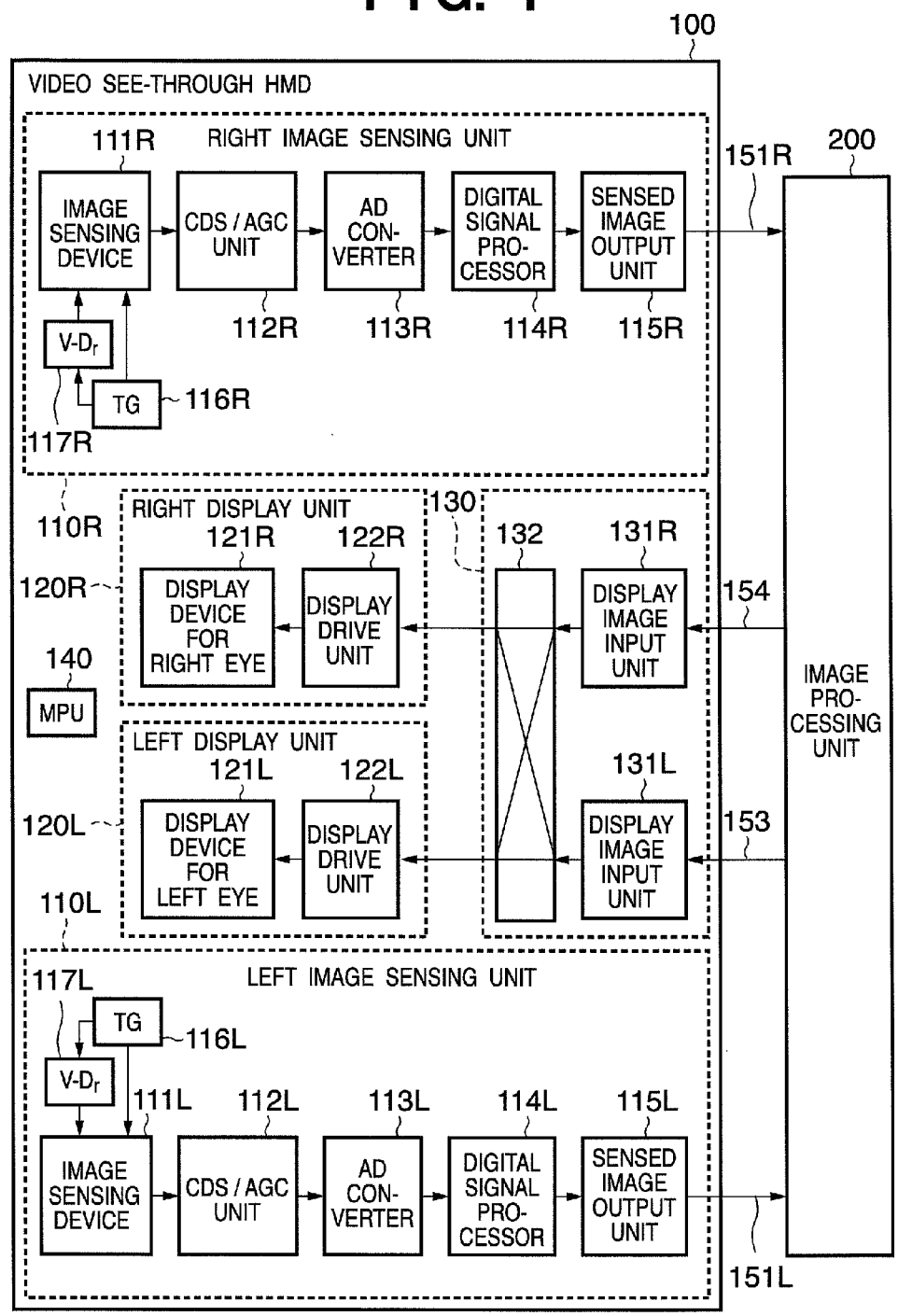
FIG. 1 is a block diagram showing an example of the structure of a mixed reality presenting system according to a first embodiment of the present invention.

FIG. 1 is a block diagram showing an example of the structure of a mixed reality presenting system according to a first embodiment of the present invention.

In FIG. 1, the mixed reality presenting system comprises a head-mounted type image-sensing and displaying device (hereinafter referred to as a video see-through HMD or simply as HMD) 100 and an image processing unit 200.

The video see-through HMD 100 comprises a right image sensing unit 110R, a left image sensing unit 110L, an image information identification unit 130, a right display unit 120R, a left display unit 120L and an MPU 140.

In the right image sensing unit 110R, an image sensing device 111R is a CCD image sensor, a CMOS image sensor or the like, which converts images into electrical signals. A timing generator (hereinafter referred to as TG) 116R generates signals that drive the image sensing device 111R. In addition, a V-Dr (V driver) 117R receives the signals from the TG 116R and generates signals that carry out control in the vertical direction of the image sensing device 111R. A CDS/AGC unit 112R performs CDS (Correlation Double Sampling) and gain adjustment on the analog signals output from the image sensing device 111R.

An AD converter 113R converts the analog signals that the CDS/AGC unit 112R outputs into digital signals. A digital signal processor 114R performs gain control, color control, luminance control and gamma correction on the digital signals that the AD converter 113R outputs, and outputs sensed image signals. A sensed image output unit 115R converts the sensed image signals into a data format suitable for transmission over a digital interface such as a USB or an IEEE 1394, and outputs the formatted data to the image processing unit 200.

Figure 2:
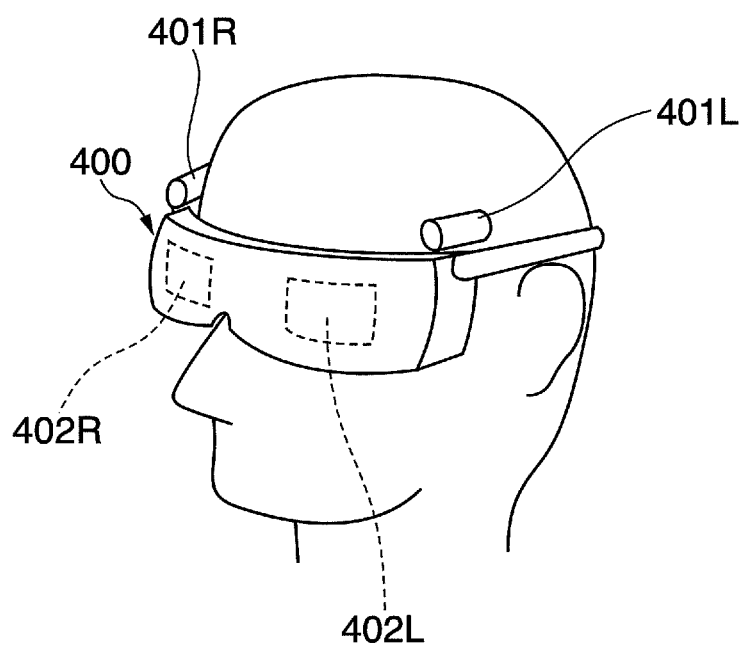
FIG. 2 is a schematic diagram showing the state of attachment of a stereoscopic video see-through HMD.

Except for outputting sensed images sensed from the vicinity of the left eye viewpoint of the HMD wearer instead of the right eye, the structure and the operation of the left image sensing unit 110L is exactly the same as that of the right image sensing unit 110R. In addition, the right image sensing unit 110R and the left image sensing unit 110L may be implemented by, for example, compact video cameras. In addition, the right image sensing unit 110R and the left image sensing unit 110L, as shown as stereoscopic video cameras 401R, 401L in FIG. 2, are fixedly mounted at portions of the HMD 400 in the vicinity of both eyes of the wearer (observer) so as to face in the same direction as the line of sight of the observer when the HMD is worn correctly. The real space images sensed by the right and left image sensing units 110R, 110L are input to the image processing unit 200 through cables (also referred to as sensing unit cables) 151R, 151L.

The image information identification unit 130 receives through cables (also referred to as display cables) 153, 154 composite images for the left eye and composite images for the right eye that are pairs of images for display generated by the image processing unit 200. The image information identification unit 130 comprises display image input units 131R, 131L and a switcher 132.

The switcher 132 is a two-input/two-output matrix switch, the inputs of which are the composite images output by the image input units 131R, 131L and to the outputs of which are connected the right display unit 120R and the left display unit 120L. The display image input units 131R, 131L identify information for distinguishing between left and right display images contained in the composite images and notify the results to the MPU 140. The MPU 140 switches the connections between the inputs and the outputs of the switcher 132 as necessary so that the composite images for the right eye are output to the right display unit 120R and the composite images for the left eye are output to the left display unit 120L.

The right display unit 120R comprises a display device for the right eye 121R and a display drive unit 122R for driving the display device 121R. Similarly, the left display unit 120L comprises a display device for the left eye 121L and a display drive unit 122L for driving the display device 121L. Preferably, the display devices 121R, 121L are compact, lightweight display devices such as LCD displays, organic EL displays or the like.

The MPU 140 is a microprocessor equipped with, for example, a CPU, a ROM that stores a control program for the CPU, and a RAM used as the CPU work area. By the CPU executing the control program stored in the ROM, the MPU 140 controls each part of the video see-through HMD and implements a variety of operations described later.

(Image Processing Unit Configuration)

Figure 8:
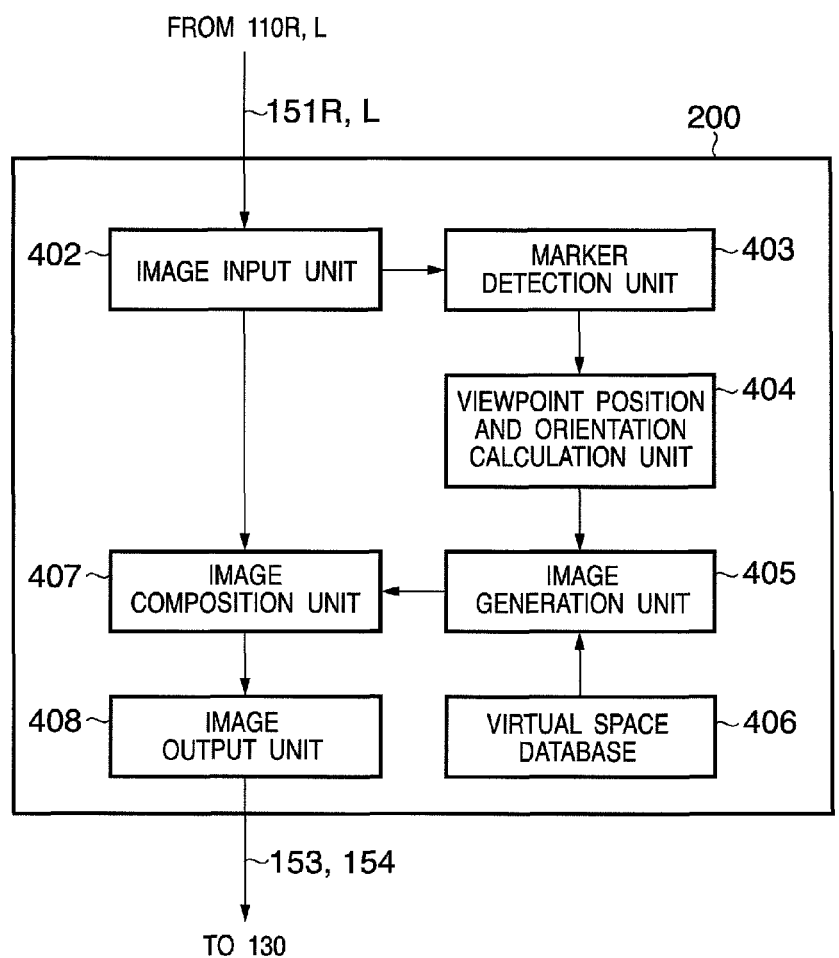
FIG. 8 is a block diagram showing an exemplary configuration of an image processing unit 200 in the mixed reality presenting system according to the first embodiment of the present invention.

FIG. 8 is a block diagram showing an exemplary configuration of the image processing unit of the present embodiment.

It should be noted that, below, for ease of description and understanding, the description is of processing performed on a single image even if that process is carried out on a pair of images sensed by each of the right image sensing unit 110R and the left image sensing unit 110L. However, in actuality, the same process is performed on each of the images sensed by each of the image sensing units, and a pair of composite images is produced and displayed independently on the display device for the right eye 121R and the display device for the left eye 121L of the HMD 100.

An image input unit 402, which is a digital interface adapted for sensed image output units 115R, L, receives sensed images from the image sensing units 110R, L and supplies them to an image composition unit 407 and a marker detection unit 403.

From the sensed images supplied from the image input unit 402, the marker detection unit 403 detects, for example, two-dimensional markers placed in real space in advance. The two-dimensional markers are indexes whose absolute positions within real space are already known and which have characteristics (color, shape, pattern and so forth) that can be extracted from the sensed images. Therefore, the marker detection unit 403 detects the two-dimensional markers by searching for areas that match the characteristics of the two-dimensional markers from among the images.

A viewpoint position and orientation calculation unit 404 calculates the three-dimensional position and orientation of the HMD 100 using marker information detected by the marker detection unit 403 (such as the positions within the image, the orientation and surface areas of the markers) as well as the position in the marker coordinate system of the marker characteristic points and the camera parameters of the image sensing unit 110. As for the processing that the viewpoint position and orientation calculation unit 404 performs, the position and orientation calculation technology is well known within that technical field and moreover is not directly related to the present invention, and thus a detailed description thereof shall be omitted here.

A virtual space database 406 is, for example, a hard disk drive, and contains virtual object three-dimensional CG model data.

Based on the virtual object three-dimensional CG model data stored in the virtual space database 406 and the HMD 400 position and orientation data calculated by the viewpoint position and orientation calculation unit 404, an image generation unit 405 generates the three-dimensional CG images that should be observed from the viewpoints of the left eye and the right eye of the observer and supplies the generated CG images to the image composition unit 407. In the generation of the CG images in the image generation unit, geometric data on the CG models contained in the virtual space database 406, attribute information such as color and texture, and lighting information are used. It should be noted that the generation of three-dimensional CG images is a known art, and therefore a detailed discussion thereof shall be omitted here.

The image composition unit 407 combines sensed images from the image input unit 402 and CG images (images of virtual objects) from the image generation unit 405 and generates a composite image for the right eye and a composite image for the left eye. An image output unit 408 is for example a DVI interface or other such display interface, and outputs the composite images for the right eye and the composite images for the left eye output by the image composition unit 407 to the image information identification unit 130 through cables 153, 154.

It should be noted that this type of image processing unit 200 can be implemented by an ordinary commercially available computer device. Therefore, at least a portion of the processing that takes place inside the image processing unit 200 described below can be implemented as software by the CPU executing the control program.

(Image Sensing Process)

Figure 6:
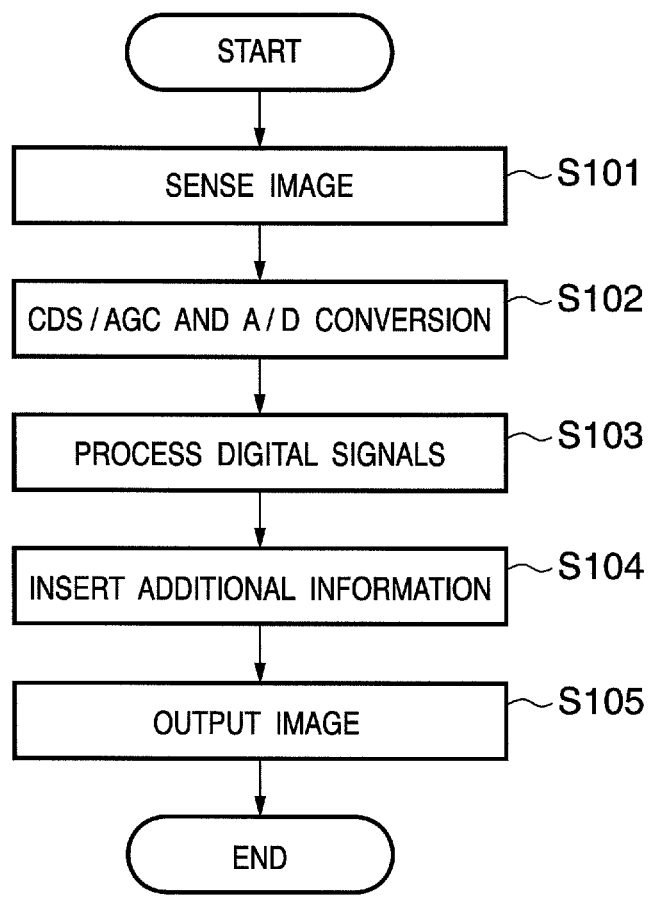
FIG. 6 is a flow chart showing sensed image data processing in a video see-through HMD according to the embodiments.

Next, a description is given of the processing of sensed image data in the video see-through HMD 100 of the present embodiment, with reference to the flow chart shown in FIG. 6.

First, in a step S101, the process begins with the sensing of parallax images of real space. The HMD 100 is mounted so that the image sensing units 110R, L are positioned near the viewpoint (pupil) position of the wearer when the HMD 100 is worn correctly. Therefore, the image sensing devices 111R, 111L of the image sensing units 110R, 110L sense images that substantially the same images as those observed from the pupil positions of the wearer of the HMD 100, that is, parallax images that differ only by the length of a baseline that corresponds to the left and right pupil positions.

The object images sensed by the image sensing devices 111R, 111L are input as analog signals to respective CDS/AGC units 112R, 112L, where such processes as CDS (Correlation Double Sampling) and gain adjustment are performed. Thereafter, the analog signals thus processed are converted into digital signals at the AD converters 113R, 113L (step S102).

Next, the sensed image signals converted into digital signals at the AD converters 113R, 113L are input to the digital signal processors 114R, 114L, gain control, color control, luminance control and gamma correction are performed, and sensed image data is generated (step S103).

Further, the digital signal processors 114R, 114L add additional information, in the form, for example, of an invisible electronic watermark, to each frame of the left and right sensed image data generated in step S103. This additional information is composed of information that at least enables left and right images to be distinguished from each other (information that represents the directionality of the image) (step S104).

In addition to information that enables left and right images to be distinguished, for example, HMD-specific information, such as image sensing lens information and shutter speed as well as photographer information, can also be included in the additional information.

In addition, instead of inserting additional information in the form of an electronic watermark in every frame of the sensed image data, alternatively such information may be inserted at every predetermined frames.

Figure 3:
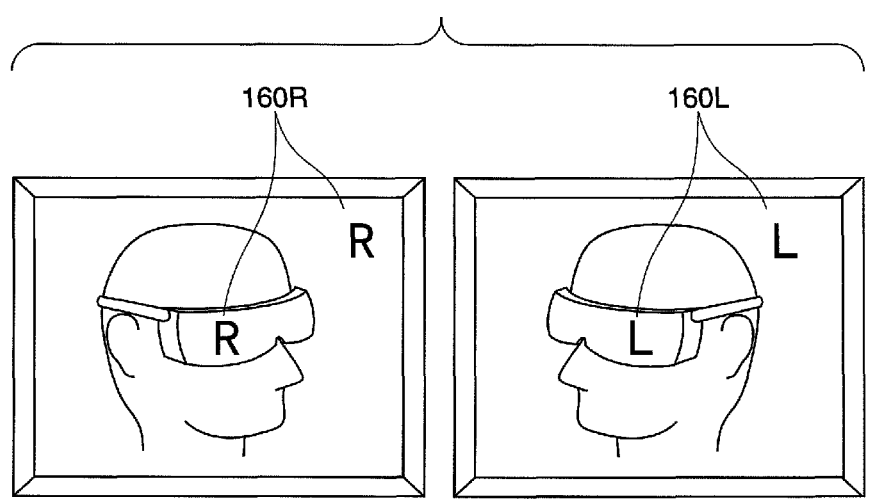
FIG. 3 is a diagram showing an example in which information representing an image for the left eye and information representing an image for the right eye is added as information in which the left and right images can be distinguished to sensed image data generated by image sensing units 110R, 110L as electronic watermark images 160R, 160L.

FIG. 3 is a diagram showing an example in which electronic watermark images (160R, 160L), representing information representing an image for the right eye and information representing an image for the left eye, are added to the sensed image data generated by the image sensing units 110R, 110L as information that enables the left and right images to be distinguished. Although in FIG. 3 examples are shown of visible electronic watermark images, such information may be embedded in the sensed image data as invisible electronic watermark images as well. In addition, such information may also be embedded in the sensed image data not in the form of images but of code information. Further, information enabling left and right images to be distinguished may be added not as electronic watermarks but instead as a portion of such commonly used additional information as image data header information. Moreover, information may be added to a single dot at the edge of the image, or information may be added to an area that is not displayed.

In a step S105, the sensed image data with the embedded electronic watermarks is output to the image processing unit 200 through the sensed image output units 115R, 115L and the sensing unit cables 151R, 151L.

At the image processing unit 200, the composition process described above is performed without regard to the embedded electronic watermarks, generating a composite image for the right eye and a composite image for the left eye. These images are then output to the image information identification unit 130 through the image output unit 408 and the display cables 153, 154.

(Display Control Process)

FIG. 7 is a flow chart illustrating the operation of the image information identification unit of the HMD 100.

In a step S201, the image information identification unit 130 receives a composite image for the right eye and a composite image for the left eye at the display image input units 131R, 131L from the image processing unit 200 over the cables 153, 154. At this stage, the image information identification unit 130 does not know which of the two composite images received is the one for the right eye and which is the one for the left eye. Then, at a step S202, from the received composite images, the display image input units 131R, 131L extract the additional information indicating which image is for the left eye and which image is for the right eye and identify that additional information. The results of that identification are reported to the MPU 140.

The MPU 140, based on the results of that identification, switches the connections between the input and the output of the switcher 132 as necessary so that the composite image for the right eye is output to the right display unit 120R and the composite image for the left eye is output to the left display unit 120L.

In other words, in a step S203, the MPU 140 receives the results of the identification performed by the display image input units 131R, 131L, and in a step S204 determines whether or not it is necessary to change the relation between the connections of the switcher 132 from the relation between the connections of the switcher 132 at the time the results of the identification are received and from the results of the identification (step S203).

When the current relation between the connections causes the composite image for the right eye to be output to the right display unit 120R and the composite image for the left eye to be output to the left display unit 120L, the MPU 140 determines that a change is not necessary and the process returns to step S201. By contrast, if the MPU 140 determines that the inputs are reversed, then in step S204 it reverses the relations between the connections of the switcher 132, and the process returns to step S201.

Thus, as described above, the present embodiment provides, in a head-mounted type display device having a display device for the right eye and a display device for the left eye, a switch capable of changing the connections between the pair of images for display and the pair of display devices. Then, by identifying the directionality of received images for display and switching the connections between the switches depending on the results of that identification, the present embodiment eliminates the need to be conscious of that directionality when connecting the cables for inputting the composite images to the HMD, therefore simplifying connection between the HMD and the devices that supply the HMD with images for display.

It should be noted that the display image input units 131R, 131L need not make an identification of all the frames in which additional information is detected and report the results of that determination to the MPU 140. Alternatively, for example, matters may be arranged so that the display image input units 131R, 131L only report the results of their determinations at each predetermined time interval or at every predetermined frames, or the most recent identification results are retained and the MPU 140 notified only when there has been a change.

In addition, matters may be arranged so that, whenever additional information indicating that a given image is either a left-eye image or a right-eye image is embedded as invisible information, the display image input units 131R, 131L add that information as visible information to the composite images. For example, by using an arrangement in which it is possible to switch between invisible and visible information in response to the input from a button for confirmation, not shown, provided on the HMD 100, it is possible to confirm whether or not the left and right images are correctly displayed in a state of attachment of the HMD 100.

Further, although in the present embodiment the MPU 140 determines the necessity of a change in the connections of the switcher 132 and controls switching, alternatively, matters may be arranged so that one or the other of the display image input units 131R, 131L performs switching.

In addition, although in the present embodiment a description is given of an HMD provided with image sensing units, it is not a requirement that image sensing units be mounted on the HMD. The image sensing units 110R, 110L may also be constituted as separate units from the HMD.

Second Embodiment

In the first embodiment of the present invention, in digital signal processors 114R, 114L contained in the image sensing units 110R, 110L, additional information representing left and right images is composed. However, alternatively, the composition of additional information may be executed in the image processing unit.

Figure 4:
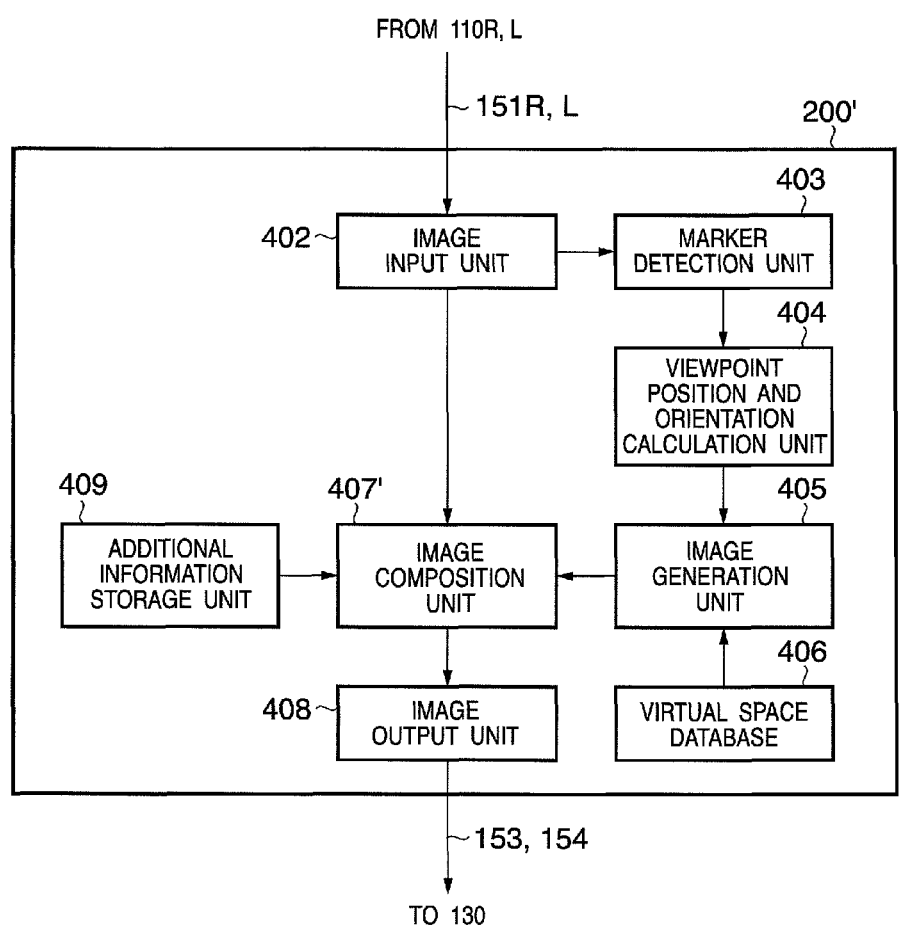
FIG. 4 is a block diagram showing an exemplary configuration of an image processing unit 200' in a mixed reality presenting system according to a second embodiment of the present invention.

FIG. 4 is a block diagram showing an exemplary configuration of an image processing unit 200' in a mixed reality presenting system according to a second embodiment of the present invention.

In this embodiment, additional information is composed in an image composition unit 407' of the image processing unit 200', without composing additional information representing left and right images in the right image sensing unit 110R and the left image sensing unit 110L.

The additional information to be composed is stored in an additional information storage unit 409. The image composition unit 407' adds additional information indicating that the image is for the right eye to images input from the right image sensing unit 110R, and adds information indicating that the image is for the left eye to images input from the left image sensing unit 110L.

In the present embodiment as well, the additional information can be added as an electronic watermark image or added as header information. In addition to information that enables left and right images to be distinguished, for example, HMD-specific information, such as image sensing lens information and shutter speed as well as photographer information, can also be included in the additional information.

In addition, instead of inserting additional information in the form of an electronic watermark in every frame of the sensed image data, alternatively such information may be inserted at every predetermined frames.

With this embodiment as well, the same effects as that of the first embodiment can be achieved. In addition, since the image processing unit adds the additional information, this embodiment can also be adapted to a mixed reality presenting system that uses an image sensing unit that does not have the ability to add additional information.

Third Embodiment

In the above-described embodiments, the composition of virtual object images and additional information for left and right sensed images are executed using a single image processing unit.

By contrast, in the present embodiment, the number of image processing units is increased to two, each dedicated to either an image for the right eye or an image for the left eye, respectively, enabling processing speed to be increased.

Figure 5:
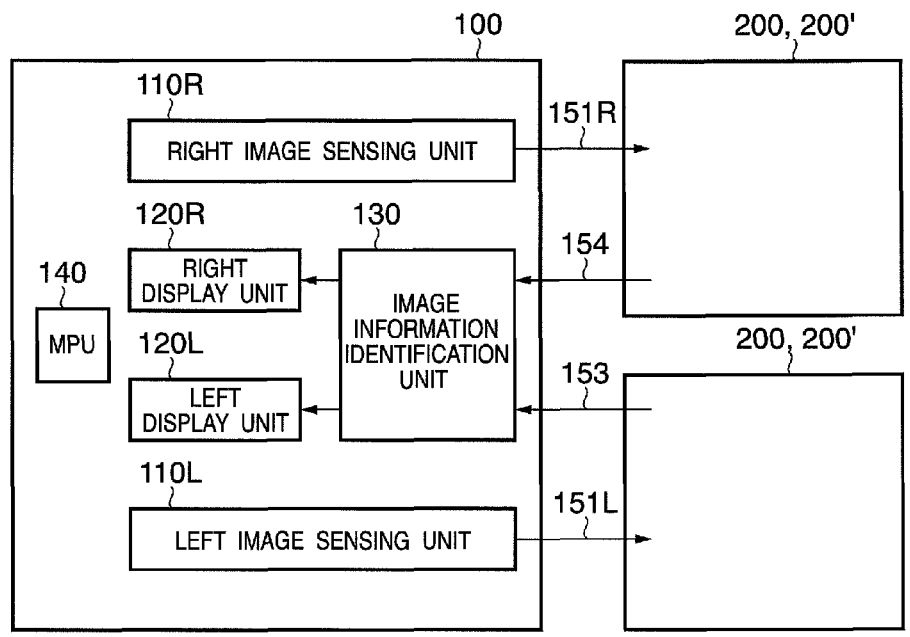
FIG. 5 is a block diagram showing an exemplary configuration of a mixed reality presenting system according to a third embodiment of the present invention.

FIG. 5 is a block diagram showing an exemplary configuration of a mixed reality presenting system according to the present embodiment. Adopting a configuration of this type enables the composition of virtual object images and the combination of virtual object images and additional information to be processed at high speed.

Fourth Embodiment

In the above-described embodiments, the focus is mainly on simplifying image input between the image processing unit and the HMD. However, in some cases the same problem exists with respect to image input between the image sensing units and the image processing unit(s).

In such cases, in the configuration of the first embodiment, a mechanism that is the equivalent of the image information identification unit 130 may be added to the image processing unit. Specifically, a structure that is the equivalent of the image information identification unit 130 is added to the first stage of the image input unit 402 and the relation between the connections of the switcher 132 are controlled so that the input images from the image sensing units 110R, 110L and the left-right relations in the input of the image input unit 402 are correct.

The determination of necessity of switching the connections and switching control may be carried out by a control unit of the image processing unit or by the display image input units 131 inside the image information identification unit 130.

Since the composition of virtual object images is such that correct composite images cannot be obtained unless the virtual images are added to sensed images correctly characterized as to left and right, it is necessary that the right and left sensed images be input correctly to the processing system for the image for the right eye and the processing system for the image for the left eye. Therefore, in cases in which there is a possibility of mistaking the connections between image sensing units 110R, 110L, the configuration of the present embodiment is useful.

Fifth Embodiment

In the fourth embodiment, the cable connections are determined by embedding additional information in the sensed images, and the display image for the right eye is displayed on the display device for the right eye and the display image for the left eye is displayed on the display device for the left eye.

In the present embodiment, a description is given of a configuration that determines the connection of the cables by controlling the image sensing units.

Figure 9:
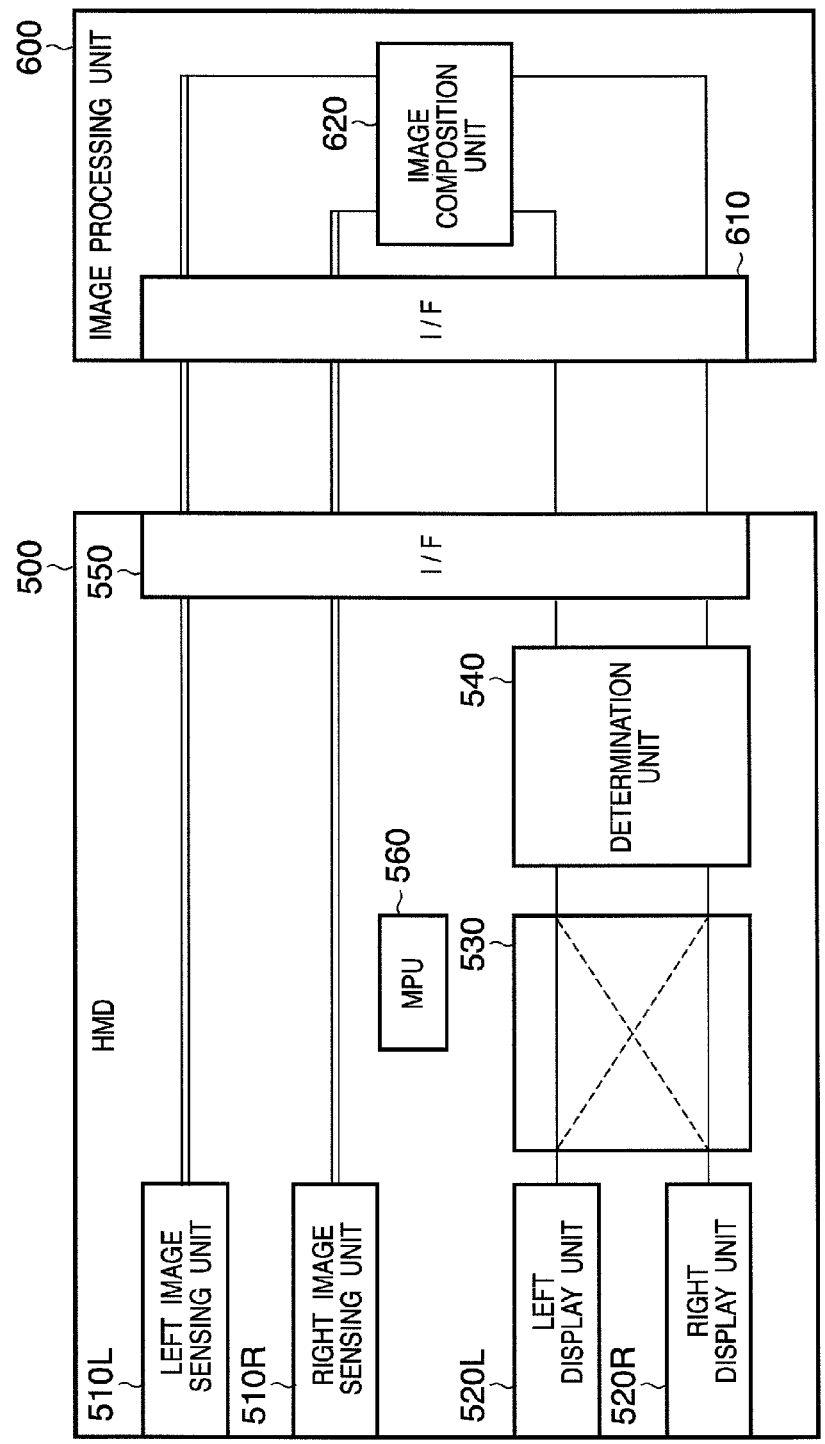
FIG. 9 is a block diagram showing an exemplary configuration of a mixed reality presenting system according to a fifth embodiment of the present invention.

FIG. 9 is a block diagram showing an exemplary configuration of a mixed reality presenting system according to the present embodiment.

In this embodiment as well, the mixed reality presenting system is composed of an HMD 500 and an image processing unit 600.

In the HMD 500, a left image sensing unit 510L and a right image sensing unit 510R sense images that are displayed respectively on a left display unit 520L and a right display unit 520R of the HMD. The left display unit 520L and the right display unit 520R display composite images (for the left eye and for the right eye) composed of sensed images and CG images supplied from the image processing unit 600. A transceiver I/F 550 is an interface for sending and receiving images and signals to and from the image processing unit 600. A determination unit 540 identifies the received composite images. A switcher 530 determines the display unit that will display the received composite image. An MPU 560 is a microprocessor having, for example, a CPU, a ROM that stores a control program for the CPU, and a RAM used as the CPU work area.

The image processing unit 600 is composed of, for example, a personal computer (PC), a work station, or the like. In the image processing unit 600, a transceiver I/F 610 is an interface that receives sensed image signals and data signals from the HMD 500 and sends composite image signals and data signals to the HMD 500. An image composition unit 620 superimposes CG images on the sensed images received at the transceiver I/F 610 and generates composite images that it then sends to the HMD 500 through the transceiver I/F 610.

Figure 10:
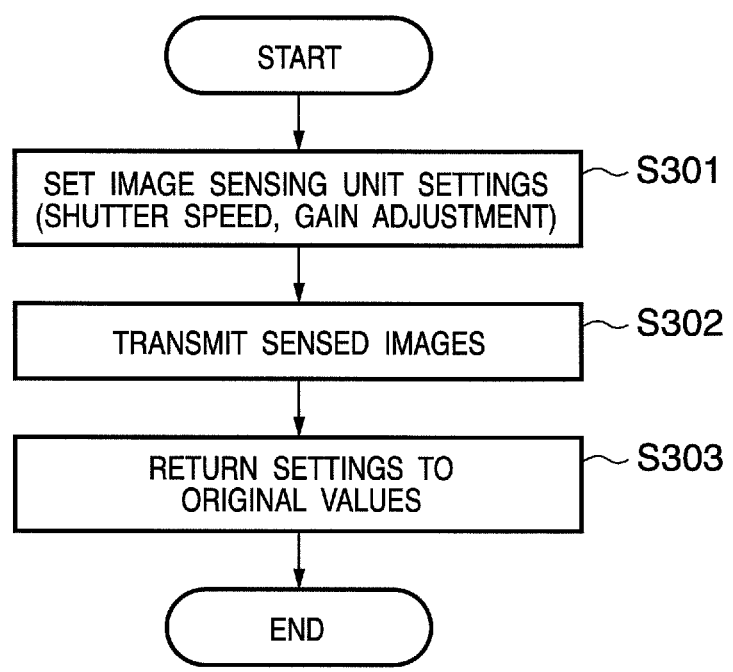
FIG. 10 is a flow chart illustrating an image sensing process during a connection determination process in the mixed reality presenting system according to the fifth embodiment of the present invention.

Next, a description is given of control of the image sensing units in the present embodiment, with reference to the flow chart shown in FIG. 10.

In a step S301, the MPU 560 controls the left and right image sensing units 510L, 510R and changes the luminance of the sensed images. For example, by controlling the shutter speed and/or gain value of the left and right image sensing units 510L, 510R, the luminance of the sensed images can be changed.

In a step S302, the MPU 560 sends the left and right sensed images obtained as a result of changing the luminance to the image processing unit 600 using the transceiver I/F 550. Thereafter, the MPU 560, in a step S303, returns the image sensing unit 510L, 510R settings to their original values, and relinquishes control of the luminance of the sensed images.

It should be noted that the luminance of the sensed images may be changed for either both or only one of the image sensing units 510L, 510R. In addition, the luminance of the sensed images may be different for the left and the right image sensing units 510L, 510R.

Figure 11:
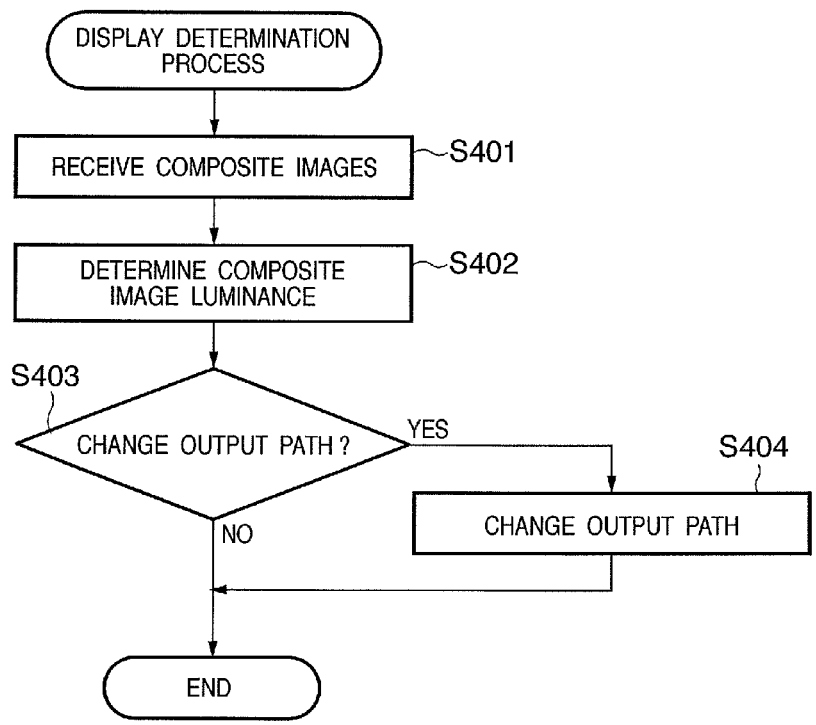
FIG. 11 is a flow chart illustrating processing performed by a determination unit in the mixed reality presenting system according to the fifth embodiment of the present invention.

FIG. 11 is a flow chart illustrating the operation of the determination unit 540.

In a step S401, the determination unit 540 receives two sensed images from the image processing unit 600 through the transceiver I/F 550. In a step S402, the determination unit 540 determines the luminance of the sensed images received. As described above, the MPU 560 controls the left and right image sensing units 510L, 510R and changes the luminance of the sensed images in advance. As a result, the determination unit 540 can predict the luminance of the sensed images to be received.

For example, in step S301 shown in FIG. 10, the MPU 560 is shown as raising the luminance of the sensed image for the left image sensing unit 510L and lowering the luminance of the right image sensing unit 510R. In this case, the determination unit 540 can predict that, of the two sensed images to be received from the image processing unit, the luminance value of the sensed image for the left eye will be higher and the luminance value of the sensed image for the right eye will be lower.

As a result, in step S402, by comparing the luminance of the two sensed images received, the determination unit 540 determines which of the sensed images received is for the right eye and which is for the left eye.

Then, in a step S403, from the relation between the state of the switcher 530 and the images output by the determination unit 540, the determination unit 540 assesses the necessity of an output path change. If in the current state of the switcher 530 the composite image for the left eye is input to the left display unit 520L and the composite image for the right eye is input to the right display unit 520R, then there is no need for an output path change. If the left-right relation between the composite images and the display units is reversed, then there is a need for an output path change.

In a step S404, the determination unit 540 requests that the MPU 560 change the output path, and the MPU 560 switches the connections between the input and the output of the switcher 530.

With the above-described configuration, the present embodiment also enables the composite images for the left eye to be displayed correctly on the left display unit and the composite images for the right eye to be displayed correctly on the right display unit.

It should be noted that, in the flow chart shown in FIG. 11, for ease of description and understanding, the assessment of the necessity of an output path change based on one pair of composite images. However, in order to improve assessment accuracy, the necessity of an output path change may be determined based on the results of assessments for a plurality of sets of composite images.

Figure 12:
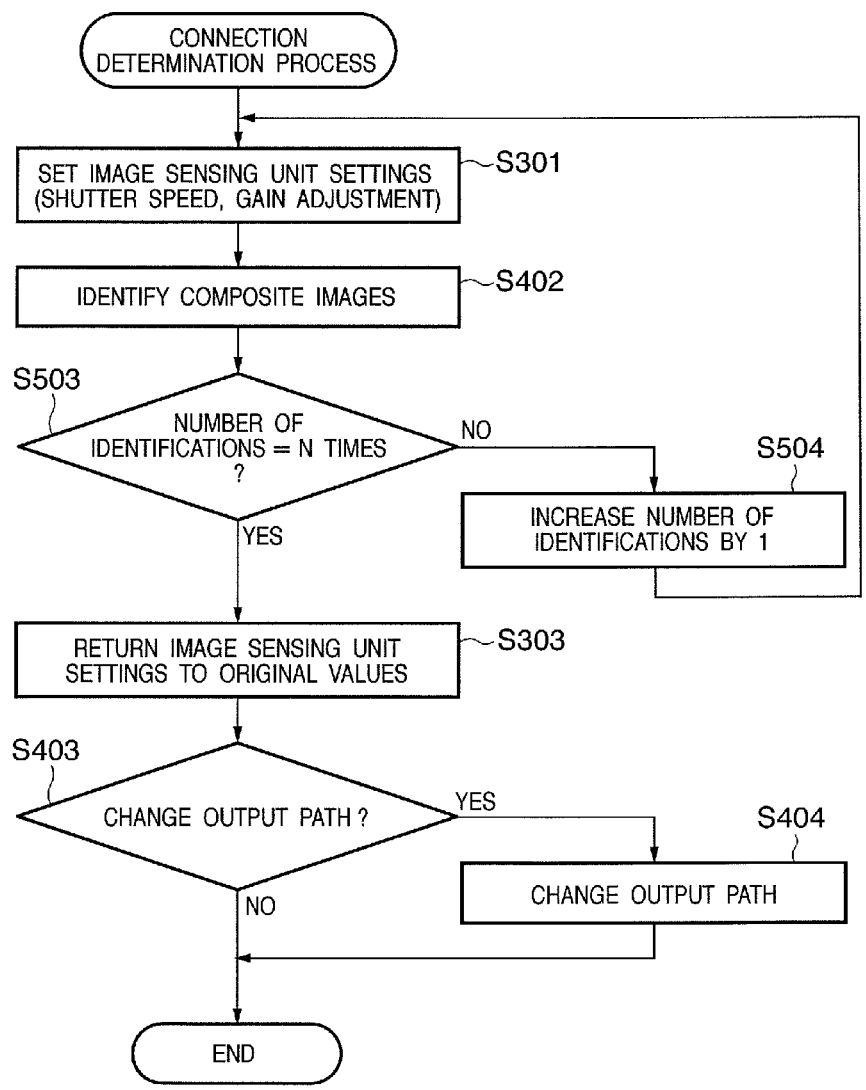
FIG. 12 is a flow chart illustrating another example of a connection determination process in the mixed reality presenting system according to the fifth embodiment of the present invention.

FIG. 12 is a flow chart illustrating processing in a case in which the assessment process is carried out multiple times. In FIG. 12, steps that perform the same processes as the process steps described in FIG. 10 and FIG. 11 are assigned the same reference numerals.

In step S301, the MPU 560 controls the left and right image sensing units 510L, 510R and changes the luminance of the sensed images. In step S402, the determination unit 540 identifies left and right for the composite images received from measuring the luminance of one set of composite images received or the like. In a step S503, it is determined whether or not the number of identifications made has reached a preset number of times (N times), and if N times is not reached then the number of times the identification is made is increased by one (step S504). If in step S503 the number of times the determination is made has reached N times, then in step S303 the MPU 560 returns the image sensing units 510L, 510R to their original settings.

In step S403, an assessment is made of the necessity of an output path change. For example, as a result of the determination of left and right based on luminance made in step S402, the assessment of the necessity of an output path change can be made on the basis of determination results obtained with a high degree of probability.

If it is determined that there is a need for a change of output path, then in step S404 the output path is changed.

According to the process shown in FIG. 12, since the changing of the luminance and the determination of left and right composite images are repeated multiple times and ultimately an assessment made of the necessity of a path change, determination accuracy is further improved.

It should be noted that, in this embodiment, there is no particular limitation on the timing with which the above-described connection determination process is performed, and accordingly, such process can be performed when the HMD 500 is activated, when the system is activated, or on the basis of user operation or the like at an arbitrary timing.

It should be noted that, in the process of determining left and right composite images, in order to change the luminance of the sensed images, the images for display may be prevented from being displayed by turning the power to the display units 520L, 520R OFF. In addition, in this embodiment, path control is performed with the switcher 530 disposed in front of the display units 520L, 520R. However, it is also possible to carry out the same control by disposing the switcher 530 between the image sensing units 510L, 510R and the transceiver I/F 550.

In addition, although in the present embodiment the image sensing units 510L, 510R are controlled by the MPU 560 of the HMD 500, alternatively the image sensing units 510L, 510R may be controlled from the image processing unit 600. In that case, the extent of the change in the luminance can be performed at a predetermined value or at a value that is determined by communication at an arbitrary timing between the HMD 500 and the image processing unit 600.

With the present embodiment, the connections are determined not by embedding additional information in the sensed images but by changing the luminance of the sensed images themselves. As a result, the circuits and processes needed to embed the additional information in the sensed images become unnecessary, enabling device cost and processing load to be reduced.

Sixth Embodiment

In the fifth embodiment, a description is given of a configuration that determines the cable connections by changing the luminance of the sensed images. In the present embodiment, a description is given of a configuration that makes the same determination not by changing the luminance of the sensed images but by changing the color of the sensed images.

It should be noted that this embodiment can also be adapted to the mixed reality presenting system described in the fifth embodiment, and therefore a description is given of the contents of the processing using the same configuration as that of the fifth embodiment.

Figure 13:
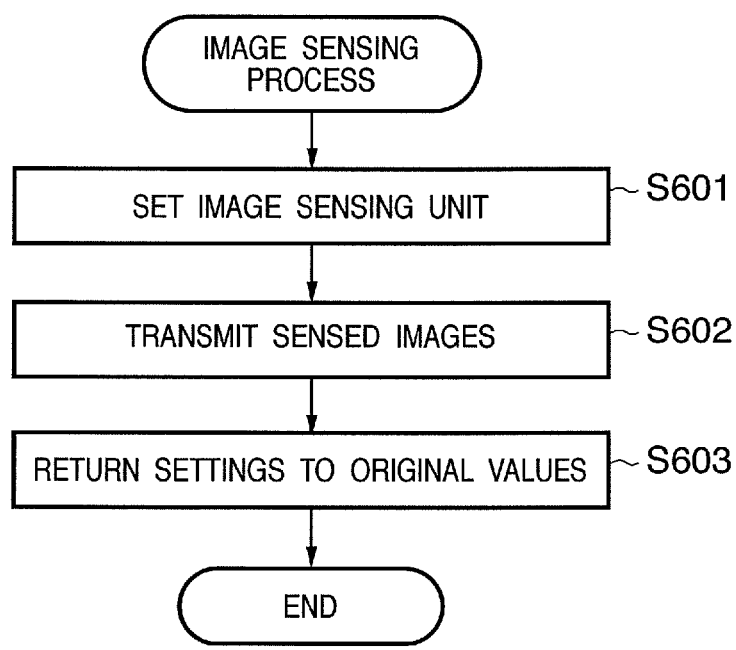
FIG. 13 is a flow chart illustrating is a flow chart illustrating an image sensing process during a connection determination process in a mixed reality presenting system according to a sixth embodiment of the present invention.

Next, a description is given of the control of the image sensing units in the present embodiment, with reference to the flow chart shown in FIG. 13.

In a step S601, the MPU 560 controls the left and right image sensing units 510L, 510R so as to change the color of the sensed images. For example, by controlling the white balance of the left and right image sensing units 510L, 510R, the color of the sensed images can be changed. For example, the MPU 560 controls the left image sensing unit 510L white balance so as to emphasize red and to de-emphasize blue and green. In addition, MPU 560 controls the right image sensing unit 510R white balance to emphasize blue and to de-emphasize red and green.

In a step S602, the MPU 560 sends left and right sensed images obtained by changing the color to the image processing unit 600 using the transceiver I/F 550. Thereafter, the MPU 560, in a step S603, returns the settings of the image sensing units 510L, 510R to their original values and relinquishes control over the luminance of the sensed images.

It should be noted that the color of the sensed images may be changed for either both or only one of the image sensing units 510L, 510R. In addition, the color of the sensed images may be different for the left and the right image sensing units 510L, 510R.

Figure 14:
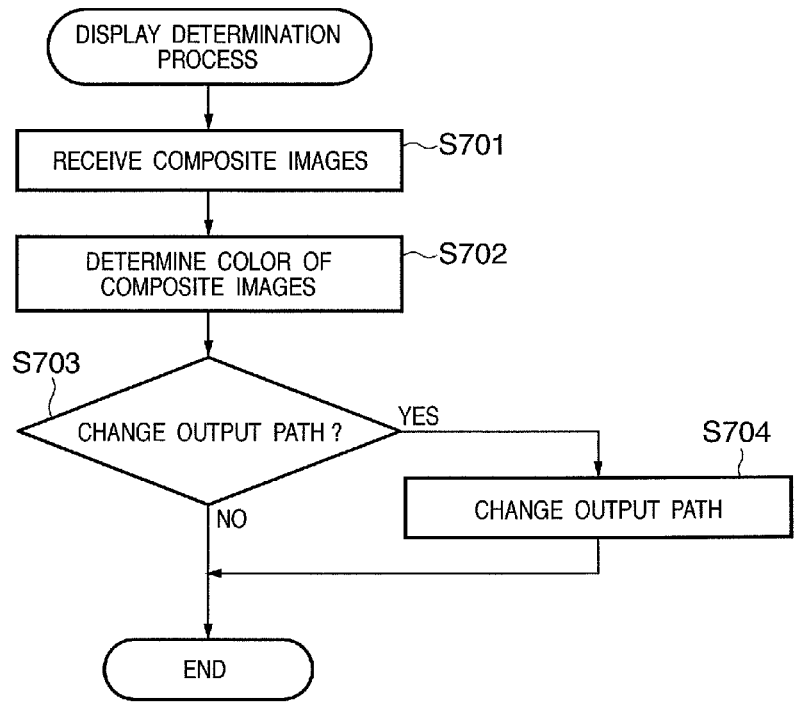
FIG. 14 is a flow chart illustrating processing performed by a determination unit in the mixed reality presenting system according to the sixth embodiment of the present invention.

FIG. 14 is a flow chart illustrating the operation of the determination unit 540 of the present embodiment.

In a step S701, the determination unit 540 receives two composite images from the image processing unit 600 through the transceiver I/F 550. In a step S702, the determination unit 540 determines the color of the composite images received. As described above, the MPU 560 controls the left and right image sensing units 510L, 510R and changes the color of the sensed images in advance. As a result, the determination unit 540 can predict the color of the composite images to be received.

For example, in step S601 in FIG. 13, assume that the MPU 560 controls each of the image sensing units 510L, 510R so as to emphasize red and de-emphasize blue and green in the sensed images of the left image sensing unit 510L and to emphasize blue and de-emphasize red and green in the sensed images of the right image sensing unit 510R, respectively.

In this case, the determination unit 540 can predict that, of the two composite images received from the image processing unit 600, the composite image for the left eye will be reddish and the composite image for the right eye will be bluish.

As a result, in step S702, by comparing the colors of the two composite images received, the determination unit 540 determines which of the composite images received is for the right eye and which is for the left eye.

Then, in a step S703, from the relation between the state of the switcher 530 and the images output by the determination unit 540, the determination unit 540 assesses the necessity of an output path change. If in the current state of the switcher 530 the composite image for the left eye is input to the left display unit 520L and the composite image for the right eye is input to the right display unit 520R, then there is no need for an output path change. If the left-right relation between the composite images and the display units is reversed, then there is a need for an output path change.

In a step S704, the determination unit 540 requests that the MPU 560 change the output path, and the MPU 560 switches the connections between the input and the output of the switcher 530.

With the above-described configuration, the present embodiment also enables the composite images for the left eye to be displayed correctly on the left display unit and the composite images for the right eye to be displayed correctly on the right display unit.

In this embodiment as well, as with the fifth embodiment, it is possible to make determinations for multiple pairs of composite images in accordance with the process described using FIG. 12, specifically by executing the process of step S601 in place of that of step S301 and the process of step S703 in place of that of step S403.

Further, the fifth embodiment and this embodiment may be combined, so as to combine determinations based on luminance and determinations based on color and ultimately determine the connections.

In addition, with respect to control of color change, besides changing the relative intensities of red, blue and green, matters may be arranged so that, for example, one of the two sensed images is made a monochrome image.

In addition, it is still possible to determine the connections based on color even when arranging matters so that monochrome charts possessed by the image sensing units and the like are output as the sensed images.

It should be noted that, in this embodiment, there is no particular limitation on the timing with which the above-described connection determination process is performed, and accordingly, such process can be performed when the HMD 500 is activated, when the system is activated, or on the basis of user operation or the like at an arbitrary timing.

It should be noted that, in the process of determining left and right composite images, in order to change the color of the sensed images, the images for display may be prevented from being displayed by turning the power to the display units 520L, 520R OFF. In addition, in this embodiment, path control is performed with the switcher 530 disposed in front of the display units 520L, 520R. However, it is also possible to carry out the same control by disposing the switcher 530 between the image sensing units 510L, 510R and the transceiver I/F 550.

In addition, although in the present embodiment the image sensing units 510L, 510R are controlled by the MPU 560 of the HMD 500, alternatively the image sensing units 510L, 510R may be controlled from the image processing unit 600. In that case, the extent of the change and the method of changing the color can be carried out at a predetermined value or at a value that is determined by communication at an arbitrary timing between the HMD 500 and the image processing unit 600.

With the present embodiment, the connections are determined not by embedding additional information in the sensed images but by changing the color of the sensed images themselves. As a result, the circuits and processes needed to embed the additional information in the sensed images become unnecessary, enabling device cost and processing load to be reduced. In addition, the determination of the correct connections acquires added reliability if monochrome charts possessed by the image sensing units are used.

Seventh Embodiment

In the fifth and sixth embodiments, the cable connections are determined by controlling the image sensing units of the HMD. In the present embodiment, the cable connections are determined by changing the resolution between the left and right composite images generated by the image processing unit. It should be noted that this embodiment can also be adapted to the mixed reality presenting system described in the fifth embodiment, and therefore a description is given of the contents of the processing using the same configuration as that of the fifth embodiment.

In this embodiment, the resolution of the composite images sent from the image processing unit 600 to the HMD 500 when the process of determining the connections is performed is made to differ between the composite image for the left eye and the composite image for the right eye. The left and right resolutions may be predetermined resolutions, or they may be determined by communication at an arbitrary timing between the HMD 500 and the image processing unit 600.

Figure 15:
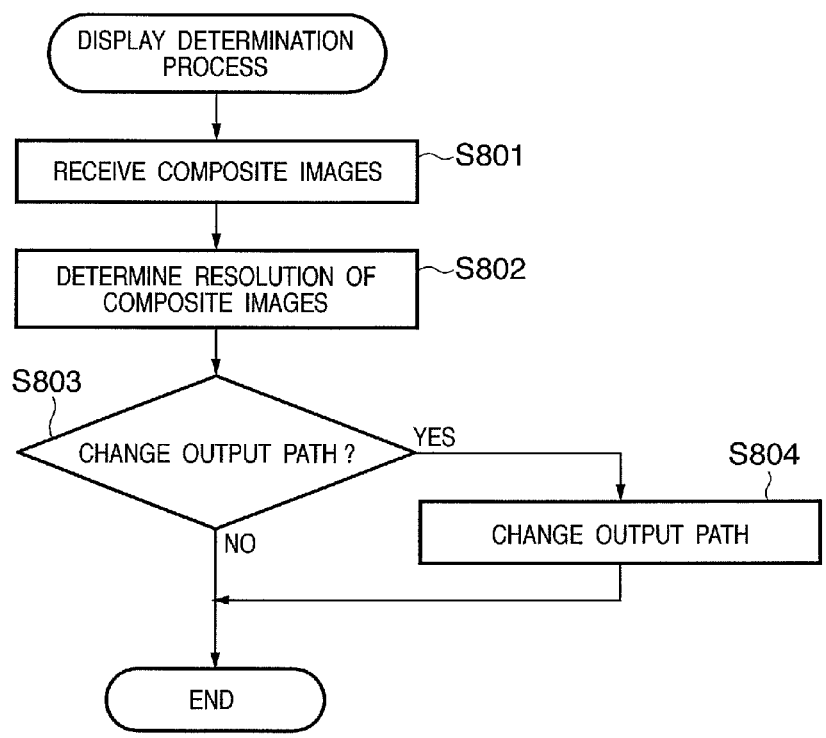
FIG. 15 is a flow chart illustrating processing performed by a determination unit in a mixed reality presenting system according to a seventh embodiment of the present invention.

FIG. 15 is a flow chart illustrating the processing operation performed by the determination unit 540 in a mixed reality presenting system according to the present embodiment.

In a step S801, the determination unit 540 receives two composite images from the image processing unit 600 through the transceiver I/F 550. In a step S802, the determination unit 540 determines the resolution of the composite images received. For example, in the process of making that determination, the image processing unit 600 may be set so as to generate a composite image for the left eye with an XGA resolution (1024×768) and a composite image for the right eye with an SXGA resolution (1280×1024).

In a step S802, the determination unit 540 makes its determination taking into account the state of the switcher 530. In other words, if the determination unit 540 receives a composite image having a resolution of SXGA for the output path of the composite image for the left eye and a composite image having a resolution of XGA for the output path of the composite image for the right eye, then in a step S803 it determines that a change of output path is necessary.

In a step S804, the determination unit 540 requests that the MPU 560 change the output path, and the MPU 560 switches the connections between the input and the output of the switcher 530. In addition, as necessary the MPU 560 notifies the image processing unit 600 that the process of determining the connections is completed. In response, the image processing unit 600 generates composite images having the original resolution and sends them to the HMD 500.

With the present embodiment as well, since there is not need to embed additional information in the sensed images, the circuits and processes needed to embed the additional information in the sensed images become unnecessary, enabling device cost and processing load to be reduced. In addition, according to this embodiment, since the luminance and the color of the sensed images are not changed, there is no need to stop display by turning power to the display units OFF or the like during the process of determining the connections.

Eighth Embodiment

Next, a description is given of a configuration in which multiple image processing units as shown in the third embodiment (FIG. 5) are present in the fifth through seventh embodiments.

Figure 16:
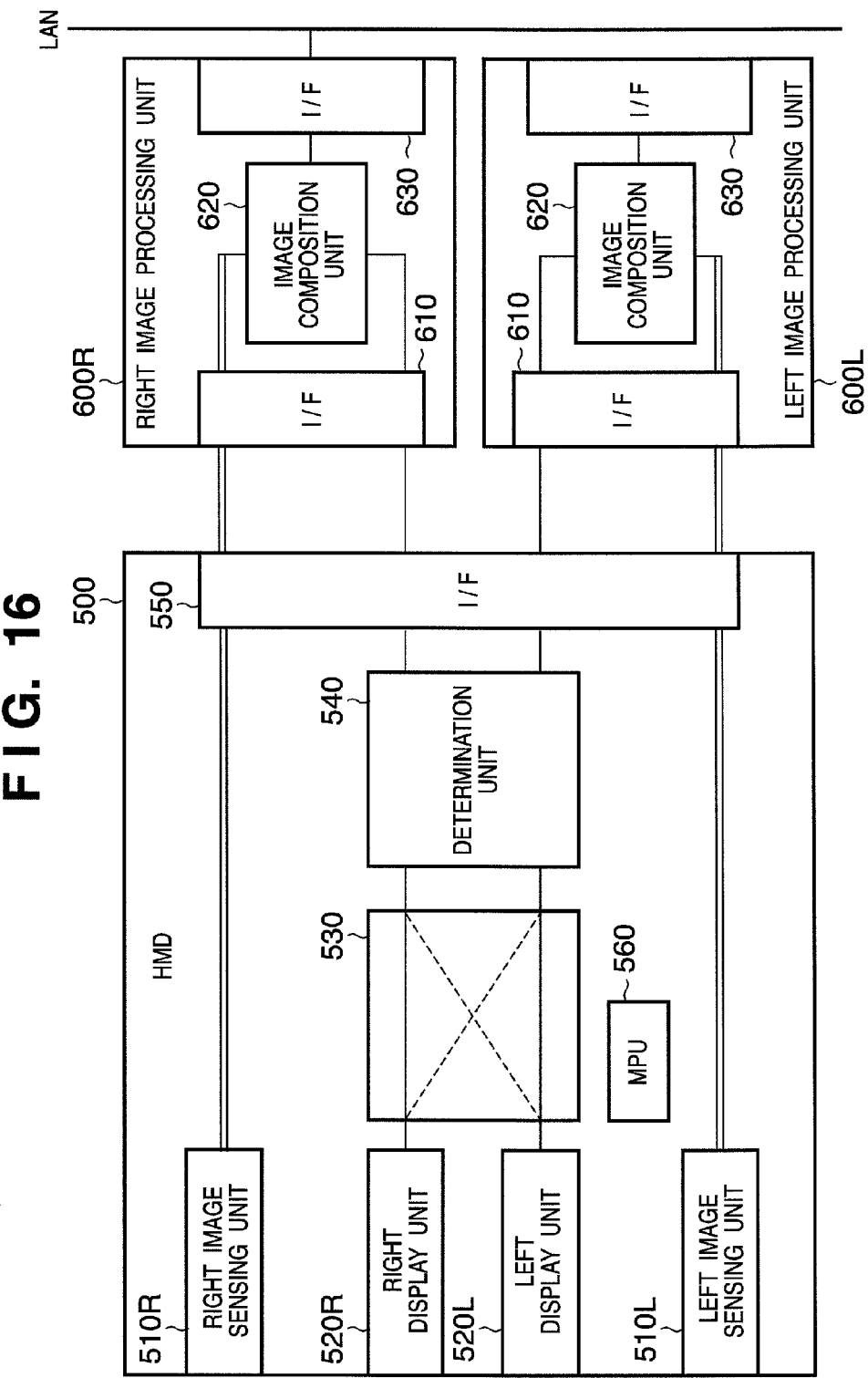
FIG. 16 is a block diagram showing an exemplary configuration of a mixed reality presenting system according to an eighth embodiment of the present invention.

FIG. 16 is a block diagram showing an exemplary configuration of a mixed reality presenting system in which two image processing units are provided based on the configuration shown in FIG. 9.

In FIG. 16, a right image processing unit 600R for processing a sensed image for the right eye and a left image processing unit 600L for processing a sensed image for the left eye are provided. Except for the fact that the sensed images that the image composition units 620 process form a single system and an I/F 630 for connection to a LAN is provided, the configurations of the image processing units 600R, 600L are identical to the image processing unit 600 shown in FIG. 9.

Figure 17:
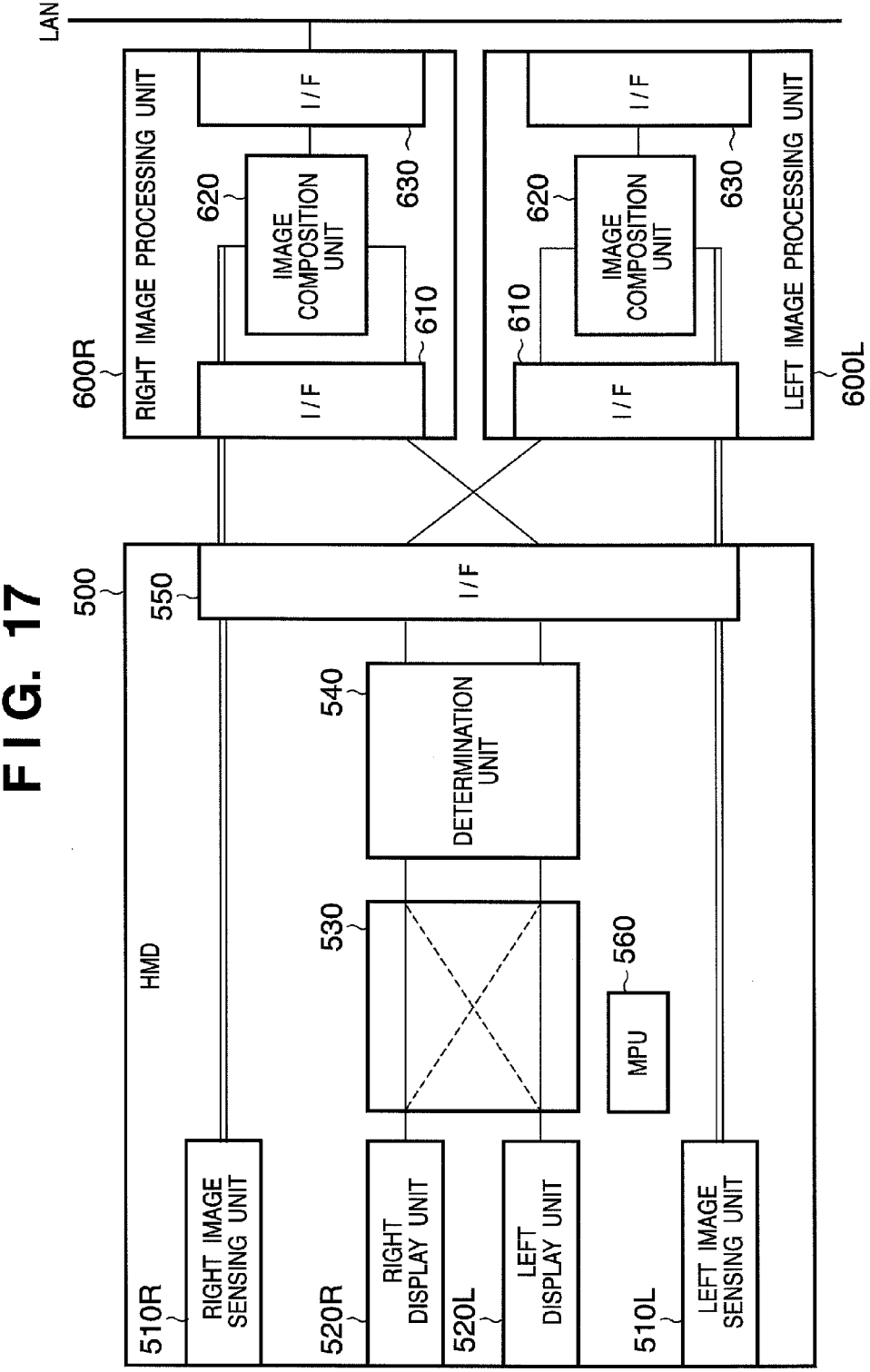
FIG. 17 is a block diagram showing a state in which left and right display cables are connected in reverse in the configuration shown in FIG. 16.

FIG. 17 is a block diagram showing a state in which left and right display cables are connected in reverse in the configuration shown in FIG. 16.

In this case, the image processing unit 600R receives the sensed image for the right eye and the image processing unit 600L receives the sensed image for the left eye, CG images are composed for the sensed images at the respective image composition units 620, and a composite image for the right eye and a composite image for the left eye are generated.

Figure 20:
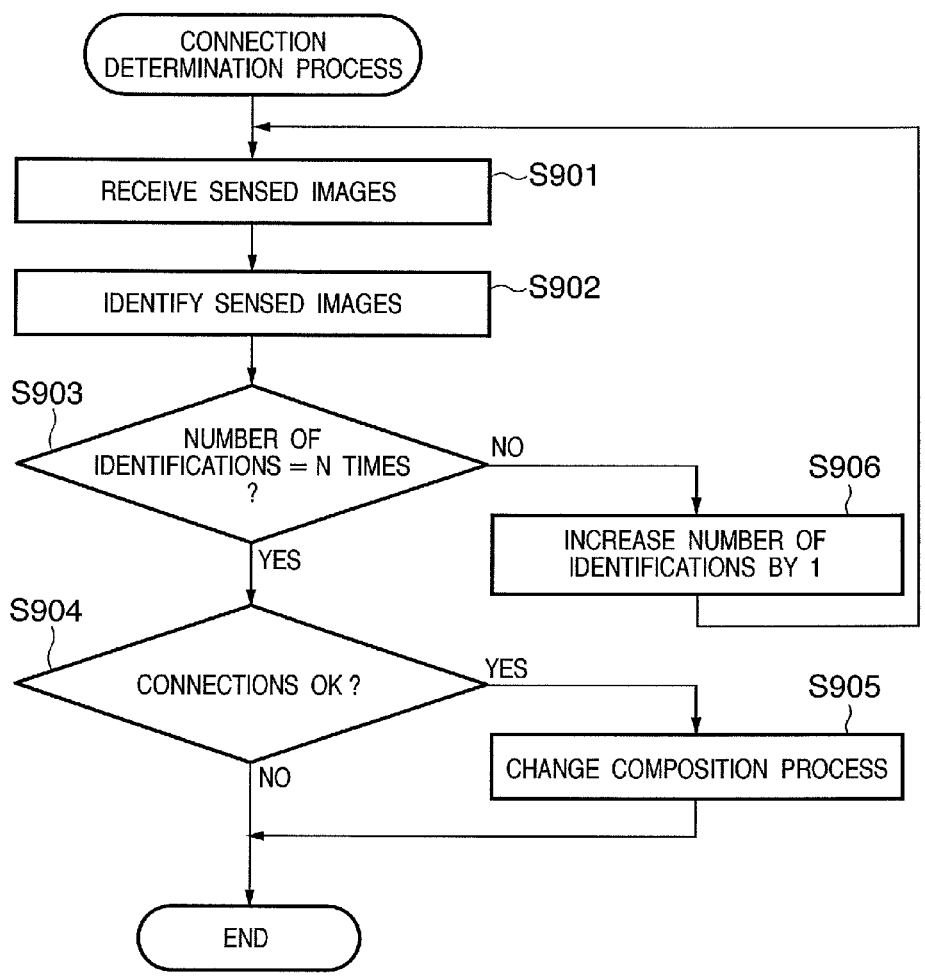
FIG. 20 is a flow chart illustrating a process performed by the image processing units 600R and 600L of determining whether sensed images received are for the left eye or for the right eye in the mixed reality presenting system according to the eighth embodiment of the present invention.

FIG. 20 is a flow chart illustrating a process performed by the image processing units 600R and 600L of determining whether sensed images received are for the left eye or for the right eye.

This process is executed by control units, not shown, included in the image composition units 620. The control units have, for example, like the MPU 560 of the HMD, a CPU, a ROM, a RAM, and so forth, with the image composition process and the determination process described below implemented by the CPU executing a program.

In a step S901, the image composition units 620 receive the sensed images and in a step S902 determine which of the sensed images is for the left eye and which is for the right eye. This determination of left and right can employ the techniques described in the fifth and sixth embodiments. In other words, the functions of the determination unit 540 are provided in at least at one of the image composition units 620. However, since in the present embodiment each image composition unit 620 receives sensed images from only one of the left and right image sensing units, it cannot make a determination based on the luminance or color of left and right sensed images.

For example, assume that, in a case in which the color of the sensed images is changed, such that a sensed image in which red is emphasized and thereafter blue is emphasized is a left sensed image, and a sensed image in which blue is emphasized and thereafter green is emphasized is a right sensed image. In this case, by changing the target and the extent of the adjustment of the color and the luminance of sensed images of the same image sensing unit and varying the change between left and right sensed images, it is possible to make a determination of left and right based on a single sensed image. How the left and right image sensing units are to be controlled can also be determined in advance, or may be set by communication at an arbitrary timing between the HMD 500 and the image processing units 600R, 600L.

In order to make a determination as to right and left based on relative change in luminance and color as described above, it is preferable to perform such determination multiple times and improve the accuracy of the determination thus made. It should be noted that, in this embodiment, in a single determination, a comparison is made between an image of a first state (in the example described above, a state in which red is emphasized in the left sensed image) and an image of a second state (in the same example, a state in which blue is emphasized) and the determination carried out.

In steps S903, S906, it is determined whether or not the number of determinations made has reached a preset number of times (N times), and if N times is not reached then the number of times the determination is made is increased by one. If the number of times the determination is made has reached N times, then in a step S904 a determination is made whether or not sensed images from the correct image sensing unit have been received. Here, for example, as a result of the determination of left and right made in step S902, the determination as to whether the connections are correct or incorrect can be made on the basis of determination results obtained with a high degree of probability.

In the state shown in FIG. 16, since the display cables and the sensing unit cables are connected correctly, in step S904 the determination is made that there is no need to change the composition process. In the case of the state shown in FIG. 17, although the connections of the display cables are reversed, since the sensing unit cables are connected correctly, the composite images are correctly generated. In other words, the relation between the left and right sensed images and the left and right composite images is correct. Therefore, the composition process of step S905 is not implemented.

However, the left-right relation of the composite images sent to the HMD 500 from the image processing units 600R, 600L is the reverse of that of the HMD 500 display units. As a result, using the embodiment described above, in the HMD 500 it is necessary to have consistency between the left-right relation of the input and the left-right relation of the output to the display units.

By so doing, the composite image for the left eye is correctly displayed on the left display unit and the composite image for the right eye is correctly displayed on the right display unit.

Figure 18:
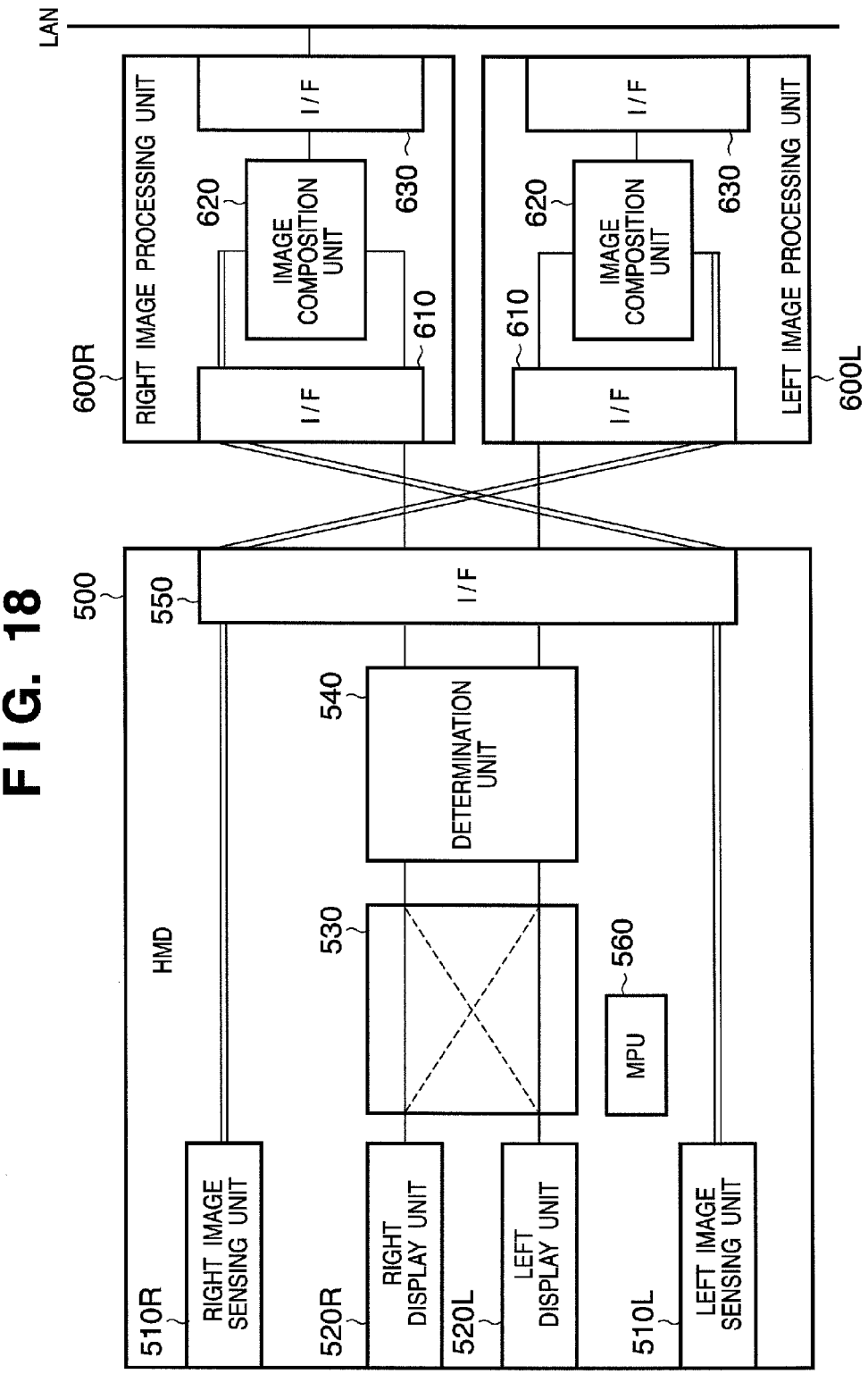
FIG. 18 is a block diagram showing a state in which left and right sensing unit cables are connected in reverse in the configuration shown in FIG. 16.

FIG. 18 is a block diagram showing a state in which left and right sensing unit cables are connected in reverse in the configuration shown in FIG. 16.

In this case, the right image processing unit 600R receives left sensed images and the left image processing unit 600L receives right sensed images, and the image composition units 620 add CG images to the sensed images. In other words, the processes of adding CG images for the right eye to the left sensed images and of adding CS images for the left eye to the right sensed images, respectively, are carried out.

In the determination process described with reference to FIG. 20, the image composition units 620 can identify the fact that the sensed images received are reversed. Therefore, in step S904, a determination is made that it is necessary to change the composition process, and in step S905 a change in the image composition process is carried out.

Accordingly, the image processing unit 600R image composition unit 620 composes a CG image not for the right eye but for the left eye, and similarly the image processing unit 600L image composition unit 620 composes a CG image not for the left eye but for the right eye.

In this case also, as with the case shown in FIG. 17, the left-right relation of the composite images sent to the HMD 500 from the image processing unit 600R, 600L is the reverse of the left-right relation of the HMD 500 display units. As a result, using the embodiments described above, in the HMD 500, it is necessary to have consistency between the left-right relation of the input and the left-right relation of the output to the display units.

Accordingly, the composite image for the left eye can be correctly displayed on the left display unit and the composite image for the right eye can be correctly displayed on the right display unit.

Figure 19:
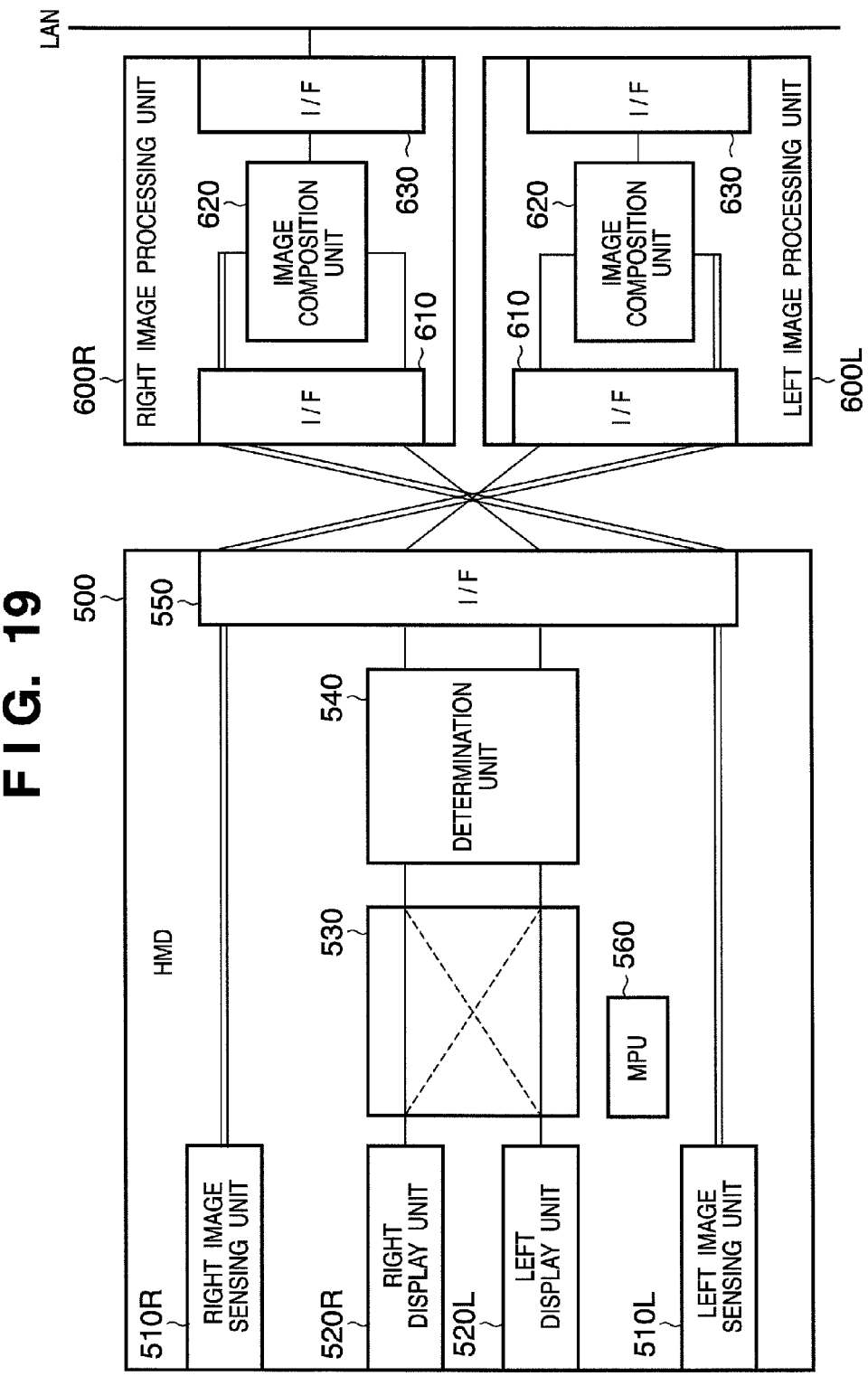
FIG. 19 is a block diagram showing a state in which both left and right image sensing and display cables are connected in reverse in the configuration shown in FIG. 16.

FIG. 19 is a block diagram showing a state in which both left and right image sensing and display cables are connected in reverse in the configuration shown in FIG. 16.

In this case also, since the left-right relation of the sensed images received by the left and right image processing units 600L, R is reversed, it is necessary to change the image composition process. However, since the display cables are reversed, the left-right relation of the composite images input to the HMD 500 with respect to the left-right relation of the display units is correct. As a result, the HMD 500 determination unit 540 determines that there is no need to switch the outputs of the images for display at the switcher 530.

Accordingly, the composite image for the left eye can be correctly displayed on the left display unit and the composite image for the right eye can be correctly displayed on the right display unit.

In the present embodiment, a description is given of adjustment in a case in which the display cables and the sensing unit cables have not been connected correctly, in a configuration in which two image processing units are provided.

Thus, as described above, according to this embodiment, even when the image sensing and/or display cables are incorrectly connected, it is still possible to display the composite image for the left eye on the left display unit and the composite image for the right eye on the right display unit.

Other Embodiments

It should be noted that, in the above-described embodiments, a description has been given of a mixed reality presenting system adapted for use as a stereoscopic video see-through HMD. However, as can be appreciated by those skilled in the art, since the present invention does not depend on the image displayed, and can be adapted to a stereoscopic video see-through HMD in any system in which it is necessary to display stereoscopic images correctly, which means that the present invention is adaptable to any stereoscopic video see-through HMD. In addition, the present invention can be similarly applied to a hand-held type display on which the user takes the display in hand and observes images in front of the eyes.

The above-described embodiment can also be implemented as software by a computer (or a CPU, MPU or the like) of a system or an apparatus.

Accordingly, since a computer implements the functional processes of the present invention, a program supplied to and installed in the computer itself also accomplishes the present invention. In other words, the computer program for implementing the functional processes of the invention is itself also included within the scope of the present invention.

In that case, so long as the system or apparatus has the capabilities of the program, the program may be executed in any form, such as an object code, a program executed by an interpreter, or script data supplied to an operating system.

In this case, the computer program for implementing the functional processes of the present invention by computer are supplied by stereoscopic or by wire/wireless communications. Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is downloaded to a connected client computer accessing the server. In this case, the program data file may also be divided into a plurality of segment files and the segment files distributed among different servers.

In other words, a server device that downloads program data files that implement the functional processes of the present invention by computer to multiple users is also covered by the claims of the present invention.

It is also possible to encrypt and store the program of the present invention on a storage medium such as a CD-ROM, distribute the storage medium to users, allow users who meet certain requirements to download decryption key data from a website via the Internet, and allow these users to decrypt the encrypted program by using the key data, whereby the program is installed in the user computer.

Besides the cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-248198, filed Aug. 29, 2005, 2006-168124, filed Jun. 16, 2006, which are hereby incorporated by reference herein in their entirety.

What is claimed is:

1. A stereoscopic display device that performs stereoscopic display by displaying images for display on a display device for right eye and a display device for left eye, respectively, comprising:
   changing unit adapted to change a value of a property of at least one of a pair of images that are used for display and compose a stereoscopic image, so that each image of the pair of images can be identified, wherein the property includes at least one of luminance, color, and resolution;
   identification unit adapted to identify each image of the pair of images for display as either a display image for the right eye or a display image for the left eye by comparing the respective values of the property of the pair of images;
   output unit adapted to take the pair of images for display as input and to output any one of the pair of images to said display device for the right eye and the other of the pair of images to said display device for the left eye; and
   control unit adapted to control said output unit so that, based on results of identification by said identification unit, one of the pair of images that is identified as the display image for the right eye is output to said display device for the right eye and one of the pair of images that is identified as the display image for the left eye is output to said display device for the left eye.

2. The stereoscopic display device according to claim 1, further comprising: stereoscopic image sensing unit having an image sensing device for the right eye and an image sensing device for the left eye for sensing an image for the right eye and an image for the left eye, respectively; and transmitting unit adapted to transmit said image for the right eye and said image for the left eye to an external device, wherein said receiving unit receives stereoscopic images composed of a pair of images for display from said external device.

3. The stereoscopic display device according to claim 2, further comprising composing unit adapted to generate composite images by adding, to said image for the left eye sensed by said image sensing device for the left eye, information indicating that such image is an image for the left eye, and adding, to said image for the right eye sensed by said image sensing device for the right eye, information indicating that such image is an image for the right eye, respectively.

4. A stereoscopic display system comprising: the stereoscopic display device according to claim 3; and image processing unit as said external device adapted to receive said composite images, performing previously determined image processing on said composite images, and outputting such processed composite images as the display image to said receiving unit.

5. The stereoscopic display system according to claim 4, wherein said image processing unit is composed of multiple constructions for receiving each of said composite images.

6. The stereoscopic display device according to claim 2, further comprising image sensing control unit adapted to cause said stereoscopic image sensing unit to perform different image processing on said image for the right eye and said image for the left eye.

7. A stereoscopic display system comprising:
   the stereoscopic display device according to claim 2;
   an image processing apparatus as said external device comprising:
      receiving unit adapted to receive said image for the right eye and said image for the left eye; and
      transmitting unit adapted to generate said stereoscopic images using said image for the right eye and said image for the left eye and transmitting such stereoscopic images to said stereoscopic display device; and
   a control device for controlling said output unit so that, based on results of identification by said identification unit, an image for display determined to be the display image for the right eye is output to said display device for the right eye and an image for display determined to be the display image for the left eye is output to said display device for the left eye.

8. The stereoscopic display system according to claim 7, wherein said image processing device comprises first image processing unit adapted to generate the display image for the right eye from said image for the right eye and second image processing unit adapted to generate the display image for the left eye from said image for the left eye.

9. The stereoscopic display system according to claim 7, wherein said stereoscopic display device comprises a head-mounted type display device.

10. The stereoscopic display system according to claim 7, wherein said stereoscopic image comprises an image in which graphic images are added to said image for the right eye and said image for the left eye.

11. A control method for a stereoscopic display device having output unit capable of taking a pair of images for display as input and outputting one such image to a display device for the right eye and the other such image to a display device for the left eye, comprising:
   a changing step of changing a value of a property of at least one of a pair of images that are used for display and composing a stereoscopic image, so that each image of the pair of images can be identified, wherein the property includes at least one of luminance, color, and resolution;

an identification step of identifying each image of the pair of images for display as either a display image for the right eye or a display image for the left eye by comparing the respective values of the property of the pair of images; and a control step of controlling said output unit so that, based on results of identification in said identification step and the current input-output relation of said output unit, one of the pair of images that is identified as the display image for the right eye is output to said display device for the right eye and one of the pair of images that is identified as the display image for the left eye is output to said display device for the left eye.

\* \* \* \* \*